(12) United States Patent   (10) Patent No.: US 12,562,573 B2
Nasr Azadani et al.   (45) Date of Patent: Feb. 24, 2026

(54) POWER STABILIZATION USING ENERGY STORAGE

(71) Applicant: Microsoft Technology Licensing, LLC, Redmond, WA (US)

(72) Inventors: Ehsan Nasr Azadani, Sammamish, WA (US); Scot Edward Heath, Fort Collins, CO (US); Shaun L Harris, Edmonds, WA (US); Paul Andrew Churnock, O'fallon, IL (US); Sean James, Olympia, WA (US); Christian L. Belady, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 18/493,669

(22) Filed: Oct. 24, 2023

(65) Prior Publication Data

US 2025/0132568 A1   Apr. 24, 2025

(51) Int. Cl.
    *H02J 3/32*   (2006.01)
    *H02J 9/06*   (2006.01)

(52) U.S. Cl.
    CPC ............... *H02J 3/32* (2013.01); *H02J 9/061* (2013.01); *H02J 2310/16* (2020.01)

(58) Field of Classification Search
    CPC ... H02J 3/00; H02J 9/00; H04N 21/24; H04N 21/00; H02B 1/21; H01L 2224/9511
    See application file for complete search history.

(56) References Cited

U.S. PATENT DOCUMENTS

| | | | | |
|---|---|---|---|---|
| 4,709,318 A | * | 11/1987 | Gephart | H02J 9/062 |
| | | | | 307/66 |
| 8,693,276 B2 | * | 4/2014 | Lai | H02J 7/345 |
| | | | | 365/228 |
| 9,065,277 B1 | * | 6/2015 | Kim | H02J 7/02 |

(Continued)

OTHER PUBLICATIONS

Akhormeh, et al., "High-Gain Bidirectional Quadratic DC-DC Converter Based on Coupled Inductor with Current Ripple Reduction Capability", IEEE Transactions on Industrial Electronics, vol. 68, Issue 9, Sep. 2021, pp. 7826-7837.

(Continued)

*Primary Examiner* — Rexford N Barnie
*Assistant Examiner* — Joseph N Inge
(74) *Attorney, Agent, or Firm* — Holzer Patel Drennan

(57) ABSTRACT

Power draw stabilization is provided. A target power consumption of a source load is determined. The source load is generated by electronics supplied power by a primary power source through a power rail. The power rail is coupled to a capacitor bank by a bi-directional converter configured to smooth fluctuations in power drawn from the primary power source by performing mode switch operations. The mode switch operations include, in response to the source load exceeding a target power consumption, controllably switching to a second directional mode that directs current released from the capacitor bank to the power rail. The mode switch operations further include, in response to the source load dropping below the target power consumption, controllably switching the operational mode of the bi-directional converter to a first directional mode to direct current from the power rail into the capacitor bank.

20 Claims, 11 Drawing Sheets

(56)     References Cited

U.S. PATENT DOCUMENTS

| | | | | |
|---|---|---|---|---|
| 10,705,586 | B2 * | 7/2020 | Chan | G06F 1/30 |
| 2003/0065961 | A1 * | 4/2003 | Koenen | G06F 1/3203 |
| | | | | 713/323 |
| 2005/0121979 | A1 * | 6/2005 | Matsumoto | H01M 10/482 |
| | | | | 307/66 |
| 2009/0314561 | A1 | 12/2009 | Handa | |
| 2011/0133560 | A1 * | 6/2011 | Yamashita | G06F 1/30 |
| | | | | 307/66 |
| 2015/0177808 | A1 * | 6/2015 | Sarti | H05K 7/1492 |
| | | | | 713/300 |
| 2015/0180232 | A1 * | 6/2015 | Mino | H02J 7/35 |
| | | | | 307/66 |
| 2015/0180233 | A1 * | 6/2015 | Yamada | H02J 7/34 |
| | | | | 307/65 |
| 2022/0065906 | A1 * | 3/2022 | Warren | G05D 23/1917 |
| 2022/0302745 | A1 * | 9/2022 | Singer | H02J 7/005 |

OTHER PUBLICATIONS

International Search Report and Written Opinion received for PCT Application No. PCT/US2024/048063, Jan. 22, 2025, 15 pages.

* cited by examiner

Power Frequency Plot
204

Spec. Range 226

Power Frequency

Time

Power Plot
202

224

Power

222

218  220

Time

Legend
206

Smoothed Portions 208

Power Frequency Effect 214

Targe Power Cons. 210

Smoothed Power Draw 216

Source Load 212

POWER STABILIZATION USING ENERGY STORAGE

BACKGROUND

Data centers and servers draw power from the power grid of a power utility company. When supporting certain types of computing operations, the power drawn from the power grid is consistent. However, other types of computing operations are characterized by more dramatic power oscillations between on and off-peak times. A power utility provider can compensate for some (smaller) oscillations but may refuse to supply power to the data center when the power draw is characterized by larger, high-frequency oscillations with the potential to introduce noise into the power grid. These oscillations in power drawn can damage components in the data centers and equipment of the grid of the utility company.

SUMMARY

According to one implementation, a power stabilizer includes a bi-directional converter and control circuitry. The bi-directional converter is electrically couplable to a power rail and a capacitor bank. The bi-directional converter is configured to direct current from the power rail into the capacitor bank when operating in a first directional mode and to direct current released from the capacitor bank to the power rail when operating in a second directional mode. The power rail is configured to supply power from a primary power source to electronics that generate a source load. The control circuitry is configured to determine a target power consumption based on measurements of the source load over a predefined time interval and smooth fluctuations in power drawn from the primary power source by selectively performing mode switch operations. The mode switch operations include controllably switching an operational mode of the bi-directional converter to the second directional mode in response to detecting that the source load exceeds a target power consumption. The mode switch operations further include controllably switching the operational mode of the bi-directional converter to the first directional mode in response to detecting that the source load has dropped below the target power consumption.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
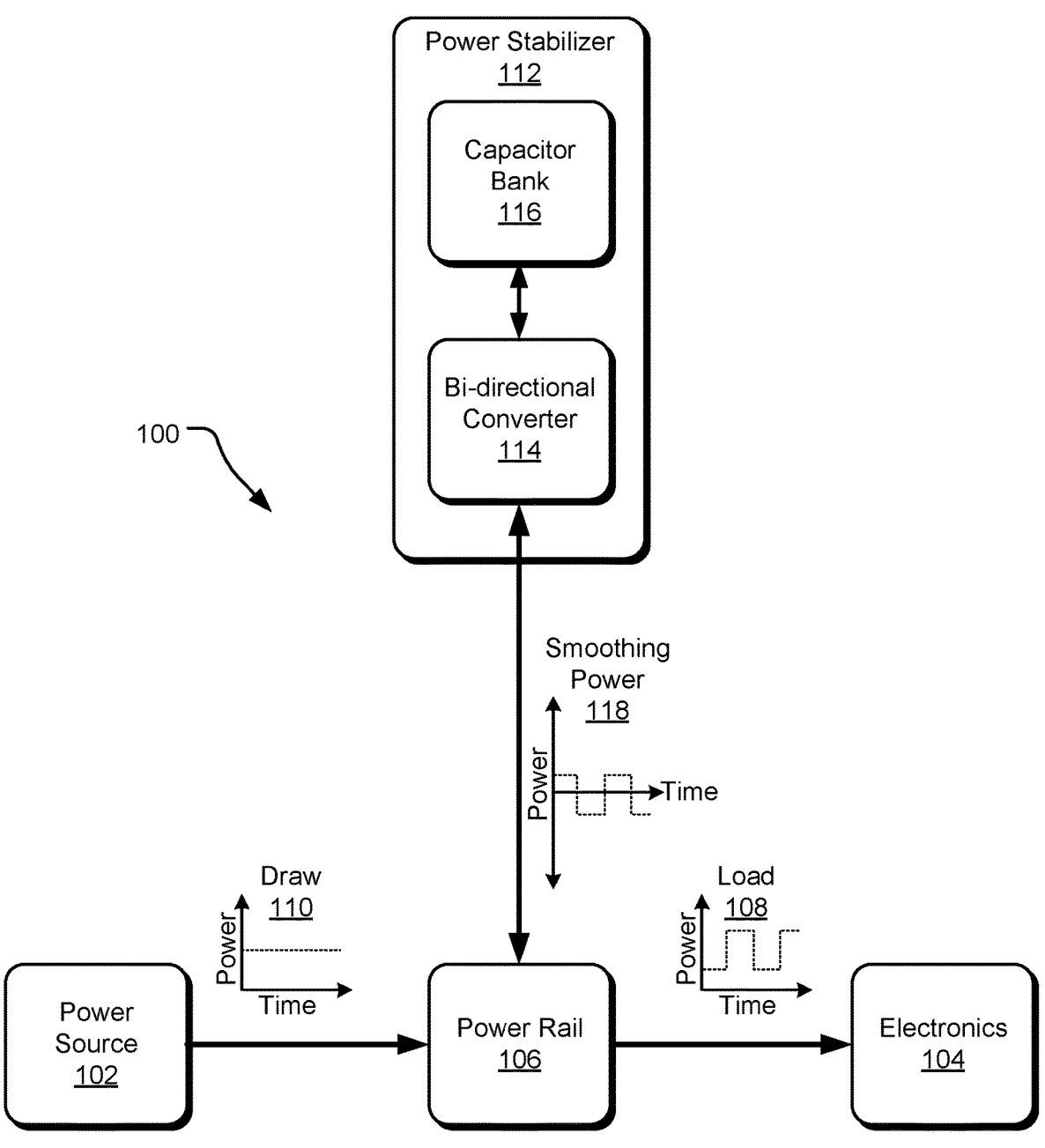
FIG. 1 illustrates an example system for stabilizing power drawn from a power source.

The amount of power that server racks in a data center draw from a power source depends upon the computational power the server racks consume while processing respective compute workloads. The power draw is relatively consistent for conventional computations. However, some types of machine learning training computations are characterized by large oscillations in computational power demand over short time intervals. High-frequency oscillations introduce noise in power systems. Power utility providers may refuse to supply power to the data center when the power drawn from the data center includes these high-frequency oscillations. Conventional power sources, such as utility power transformers, generators, data center power system components, and server rack power supply units, are inadequately equipped to mitigate these large oscillations.

The presently described technology provides a power stabilizer that stabilizes the power demand of data center operations. The power stabilizer compensates for oscillating power loads by charging or discharging power to smooth the oscillations and provide a more consistent power draw from a power source. Providing a more consistent power draw mitigates behavior that can damage power system components. In an implementation, the power stabilizer exchanges power between a capacitor bank and a power rail connected to the electronics that generate a load. The power exchanged between the capacitor bank and the power rail compensates for and smooths fluctuations in the generated load to provide a more consistent power draw from the power source.

Using a capacitor bank for power exchange provides a number of advantages relative to slower power sources, such as generators or batteries. For example, capacitors are configured to charge and discharge almost instantaneously. The quick charge and discharge of the capacitors provide quick responses to high-frequency changes in energy demand, for example, due to machine learning model training. Further, capacitors, especially supercapacitors and lithium-ion capacitors, are rated to endure significantly more (sometimes over a thousand-fold) charge cycles than batteries. The capacitor bank for power stabilization provides a quick and durable solution for the exchange of stabilizing power.

The power stabilizer includes control circuitry that determines a target power consumption, which is, for example, a single value or a range of power values. The power drawn from a system fluctuates with the fluctuation of a source load generated by electronics. To smooth fluctuations in the power draw, the power stabilizer drives the power draw toward the target power consumption by adding or removing what is referred to herein as "smoothing power"-meaning, power that has the end effect of "smoothing" the power drawn from a primary power source (e.g., power grid). In one implementation, the target power consumption is determined based on recent prior measurements of the source load, thereby representing a characteristic power consumed by the electronics. An example of the target power consumption is a moving or running average of the source load over a preceding predefined period of time (e.g., over which there have been a number of spikes or oscillations in power demand). Determining a target power consumption based on recent measurements of the source load provides a baseline for the expected power draw.

To smooth the power drawn from the power source, the control circuitry of the power stabilizer performs mode switch operations that switch between operational modes of the power stabilizer to add power to or draw power from a power rail supporting source load electronics, thereby changing the amount of power drawn from the primary power source to more closely match the target power consumption. The operational modes include a first directional mode in which the power stabilizer charges its capacitor bank by removing power from the power rail. The operational modes also include a second directional mode in which the power stabilizer provides power to the power rail by discharging power from the capacitor bank to the power rail. When the electronics generate a load that exceeds the target power consumption, the control circuitry selectively switches the bi-directional converter to the second operational mode to provide charge to the power rail to compensate for the increased power demand. When the electronics generate a load that is lower than the target power consumption, the control circuitry selectively switches the bi-directional converter to the first operational mode to provide charge to the power rail to compensate for the increased power demand. The mode switch operations drive the power drawn from the power source towards the target power consumption, thereby smoothing the power drawn from the power source.

FIG. 1 illustrates an example system 100 for stabilizing power drawn from a power source 102. In the illustrated implementation, the power source 102 is electrically coupled to electronics 104 via a power rail 106. The electronics 104 generate a source load 108 that causes a power draw 110 from the power source 102 through the power rail 106. In the illustrated example, the source load 108 includes sharp edges representing extreme oscillations between high and low power consumption. A power stabilizer 112 is electrically coupled to the power rail 106 between the power source 102 and the electronics 104 and directs smoothing power 118 to smooth the fluctuations of the source load 108 and stabilize the power draw 110 from the power source 102.

In an example scenario, the power stabilizer 112 is used to smooth power drawn from a power utility's electrical grid. In this example scenario, the power source 102 is a power utility company's electrical grid, and the electronics 104 are the power systems of servers at a data center. Servers at the data center are being used to train a machine-learning model. The training alternates between heavy-use periods in which the computations are resource-intensive (e.g., during backpropagation) and light-use periods where the computations are less resource-intensive (e.g., between iterations or during forward propagation) and require fewer computational resources. From a hardware perspective, this training is characterized by rapid on/off cycling of many graphics processing units (GPUs) in tandem. If not for the inclusion of the power stabilizer 112, this rapid CPU cycling would cause the power draw 110 to cycle between near-zero and a maximum peak several times per second, resulting in dramatic oscillations that can introduce noise into the power grid, disrupt service to other utility customers, and potentially damage equipment.

The power stabilizer 112 is electrically coupled to the power rail 106 that connects the server systems in the data center to the utility's power grid equipment. The power stabilizer 112 consumes power from or outputs power to the power rail 106 to drive actual power consumption from the power source 102 according to a trend consistent with a target power consumption. As used herein, a "target power consumption" refers to a value or a range of values. In one implementation, the target power consumption is a dynamically determined value corresponding to an average power consumption observed over a recent time interval. In other implementations, the target power consumption includes a range of values both above and below a target value, such as a set margin of values above and below the average power consumption.

When the source load 108 of the data center is lower than the determined target power consumption of the power draw 110, the power stabilizer 112 raises the power draw 110 toward the target power consumption by drawing power from the power rail 106. When the source load 108 of the server systems is greater than the target power consumption, the power stabilizer 112 lowers the power draw 110 toward the target power consumption by providing power to the power rail 106. By driving the power draw 110 toward the target power consumption in this way, the power stabilizer 112 smooths fluctuations in the power draw 110 from the utility's power grid equipment. The smoothed fluctuation in the power draw 110 spares the utility's power grid equipment from stress and damage. In other example scenarios contemplated herein, the power stabilizer 112 exchanges smoothing power with a localized power source rather than directly with the utility grid. For example, the power stabilizer 112 exchanges power with an uninterruptible power supply (UPS), a transformer, a data center power supply unit (PSU), or within the circuitry of a server rack.

In an implementation, to smooth fluctuations in the power draw 110, the control logic of the power stabilizer 112 determines a target power consumption from the power source 102. An example of the target power consumption is a moving average of the source load 108 over a predefined period of time (e.g., a predefined number of samples) or over a predefined number of oscillations in the source load 108. The power stabilizer 112 selectively directs the current in the first directional mode or the second directional mode to adjust the power draw 110 toward the target power consumption. In so doing, the power stabilizer 112 uses the average power consumption as the target power consumption, to which the power stabilizer 112 drives the power draw 110. Using the average power consumption as a target power consumption provides a simply calculated target that generally represents a recent middle range of the source load 108.

In order to smooth the power draw 110, the control logic of the power stabilizer 112 instructs the bi-directional converter 114 to switch between operational modes to exchange smoothing power 118 to drive the power draw 110 toward the target power consumption. The bi-directional converter 114 electrically couples a capacitor bank 116 to the power rail 106 and controls the current flow of the power stabilizer

112. In implementations, the capacitor bank includes a lithium-ion capacitor, an ultra-capacitor, or a supercacitor. The bi-directional converter 114 can include one or more diodes, FETs, voltage converters, or switches to control the direction of current. In implementations, the control logic of the power stabilizer 112 switches between operational modes by modifying the voltage at an input of the capacitor bank 116.

In an implementation, the power stabilizer 112 is configured to detect that the source load 108 satisfies a first mode switch condition. For example, the first mode switch condition is satisfied when the source load 108 exceeds a target power consumption. In response, the power stabilizer selectively switches the operational mode of the bi-directional converter 114 to a first directional mode (e.g., a capacitor charging mode). In the first directional mode, the bi-directional converter 114 directs current from the power rail 106 to the bi-directional converter 114 to remove the smoothing power 118 from the power rail 106. In the first directional mode, the smoothing power 118 charges the capacitor bank 116, illustrated as positive power consumption (representing the removal of power from the power rail 106).

In this implementation, the power stabilizer 112 is further configured to detect that the source load 108 satisfies a second mode switch condition. For example, the second mode switch condition is satisfied when the source load 108 has dropped below the target power consumption. In response, the power stabilizer selectively switches the operational mode of the bi-directional converter 114 to the second directional mode (e.g., a capacitor discharging mode). In the second directional mode, the bi-directional converter 114 directs current released from the capacitor bank 116 to the power rail 106 to provide the smoothing power 118 to the power rail 106. In the second directional mode, the smoothing power 118 discharges from the capacitor bank 116, illustrated as negative power consumption.

In one implementation, the target power consumption corresponds to a single threshold, and the operational mode of the bi-directional converter 114 is switched whenever the source load 108 "crosses" the threshold (e.g., in satisfaction of a mode switch condition). For example, the threshold is an average power consumption over a predefined time interval. This implementation simplifies the control logic and control hardware and also provides quicker responses to fluctuations in the source load 108. In other implementations, the target power consumption corresponds to a range of values, and the operational mode of the bi-directional converter 114 is switched whenever the source load 108 rises above or drops below the range of values. In this case, the selective smoothing of the source load 108 creates a non-correction dead band around a threshold (e.g., a target power consumption). Because this implementation includes a non-correction dead band, the power stabilizer 112 is further configured to operate in an inactive mode. When switching to the inactive more, the bi-directional converter 114 ceases the direction or transmission of current between the power rail 106 and the capacitor bank 116. Selectively switching to the inactive mode reduces oscillatory behavior in the power stabilizer 112, preserving the components in the power stabilizer 112 from superfluous wear.

In implementations, the power stabilizer 112 includes control logic that drives the power draw 110 toward the target power consumption (e.g., the average power consumption) based on whether one or both of the source load 108 or the power draw 110 satisfy a mode switch condition. The mode switch conditions can be static or dynamic based on voltage, power, current, or frequency detections or calculations at components described herein. Mode switch conditions based on the source load 108 exceeding or dropping below a target power consumption (e.g., target value or target range of values) have been described. The power stabilizer 112 may additionally or alternatively switch operational modes based on the satisfaction of other mode switch conditions. Other examples of mode switch conditions include whether a change (e.g., a derivative) in the source load 108 or in a power level difference between the source load 108 and the average power consumption is outside of a predefined range, whether current supplied by the power source 102 to the power rail differs from a running average current by a predefined margin (in a manner analogous to the described average power consumption), whether the voltage at the power rail differs from a running average voltage by a predefined margin, whether a predefined time interval (or a corresponding number of samples) from a last mode switch operation has elapsed, whether of charge of the capacitor bank 116 is outside of a predefined level or range, or whether a frequency of the power level or voltage at the power rail 106 differs from a running average by a predefined margin.

In various implementations, the power stabilizer 112 statically or dynamically controls the magnitude and/or properties of the smoothing power 118 charge or current exchanged between the capacitor bank 116 and the power rail 106. For example, the magnitude of charge or current exchanged is based on the magnitude of a deviation of the source load 108 from the target power consumption (e.g., the average power consumption) or based on sensed current and/or voltage of the power rail 106 or a component attached thereto. The power stabilizer 112 may further be configured to determine a current and/or voltage of the smoothing power 118 to compensate for fluctuations in the properties (e.g., current, voltage, or voltage frequency) of the source load 108. Controlling the magnitude and/or properties of the charge or current exchanged provides refined control of the smoothing power 118 used to smooth the power draw 110.

In implementations, the power stabilizer 112 is configured to maintain the capacitor bank 116 within predefined ranges of charge. For example, in times of stability in the power draw 110, the power source 102 can provide sufficient power both to satisfy the source load 108 and also charge the capacitor bank 116. However, if the capacitor bank 116 is charged to capacity, the capacitor bank 116 is inadequate to receive charge in the first directional mode. Alternatively, if the capacitor bank 116 is depleted of charge, the capacitor bank 116 is unable to provide power in the second directional mode. In these implementations, to maintain the capacitor bank 116 in a state of readiness to both discharge and be charged, the power stabilizer 112 is configured to switch the operational mode of the bi-directional converter 114 to a charge preservation mode in which the power stabilizer 112 maintains the capacitor bank 116 within a predefined range of charge. The bi-directional converter 114 may switch to the charge preservation mode responsive to detecting that the charge of the capacitor bank 116 (and/or of a slow power storage device) is approaching a limit of the predefined charge range or falls outside of the predefined charge range. In implementations, the charge range may be static or may be dynamically determined based on measurements of elements of the system 100 sensed by the power stabilizer 112, such as temperature, pressure, voltage magnitude, voltage frequency, current magnitude, whether the power is AC or DC, or the like.

In various implementations, the power stabilizer 112 uses different control mechanisms to control the level of charge in the capacitor bank 116. For example, the control logic of the power stabilizer 112 can modify the voltage between the power rail 106 and the capacitor bank 116 (e.g., in the bi-directional converter 114) to modify the potential for exchanging charge between the capacitor bank 116 and the power rail 106. Additionally or alternatively, the control logic of the power stabilizer 112 uses switches, field effect transistors, other transistors, or diodes to control whether and/or in which direction charge is exchanged between the power rail 106 and the capacitor bank 116. Maintaining the capacitor bank 116 within the predefined range of charge maintains the capacitor bank 116 in a state of readiness to charge or discharge the smoothing power 118 and stabilize the power draw 110.

In implementations, the power stabilizer 112 is additionally electrically coupled to a slow power source and includes control logic to control the slow power source, such as a battery bank or a generator. In these implementations, the power stabilizer 112 exchanges the smoothing power 118 using both the capacitor bank 116 and the slow power source. The slow power source is electrically attached to the power rail 106 by the power stabilizer 112, or the slow power source is electrically coupled to the power rail 106 without the power stabilizer 112 as an intermediary. The slow power source takes longer to initiate and accelerate the exchange of the smoothing power 118 than the capacitor bank 116 and, accordingly, is limited in the smoothing power 118 instantaneously exchangeable for smoothing sharp power curves. However, the slow power source tends to have a greater capacity for energy storage or exchange than the capacitor bank 116 for sustained exchange of the smoothing power 118.

Accordingly, the power stabilizer 112 uses the capacitor bank 116 to exchange smoothing power 118 to address quick, sharp, or high-frequency deviations (e.g., an edge of a square wave as illustrated) in the source load 108 from a target power consumption. The power stabilizer 112 uses the slow power source to address sustained deviations in the source load 108 from the target power consumption. In an implementation, the power stabilizer 112 is configured to exchange smoothing power 118 with the power rail using the capacitor bank 116 until the charge of the capacitor bank 116 falls outside a predefined range of charge. Then, the power stabilizer executes mode switch operations to exchange smoothing power using the slow power source.

Switching the operational mode of the power stabilizer 112 using the capacitor bank 116 and the slow power source, as described above, provides advantages over systems that exchange power using only the capacitor bank 116 or the slow power source. For example, the use of the capacitor bank 116 for high-frequency power fluctuations provides a quicker response than slow storage. High-frequency power fluctuations occur relatively frequently, so the more frequent use of the capacitor bank 116 for the smoothing power 118 takes advantage of the greater number of charge cycles the capacitor bank 116 endures than the slow power source. Using the slow power source to provide the smoothing power 118 during periods of sustained fluctuation capitalizes on the slow power source's large charge exchange capacity, which is greater than that of the capacitor bank 116. Also, the power stabilizer 112 can rely on the slow power source to assume the role of exchanging the smoothing power 118 to maintain the capacitor bank 116 within a predefined charge range. Accordingly, exchanging the smoothing power 118 with both the capacitor bank 116 and the slow power storage provides a more comprehensive solution than with one of them.

Figure 2:
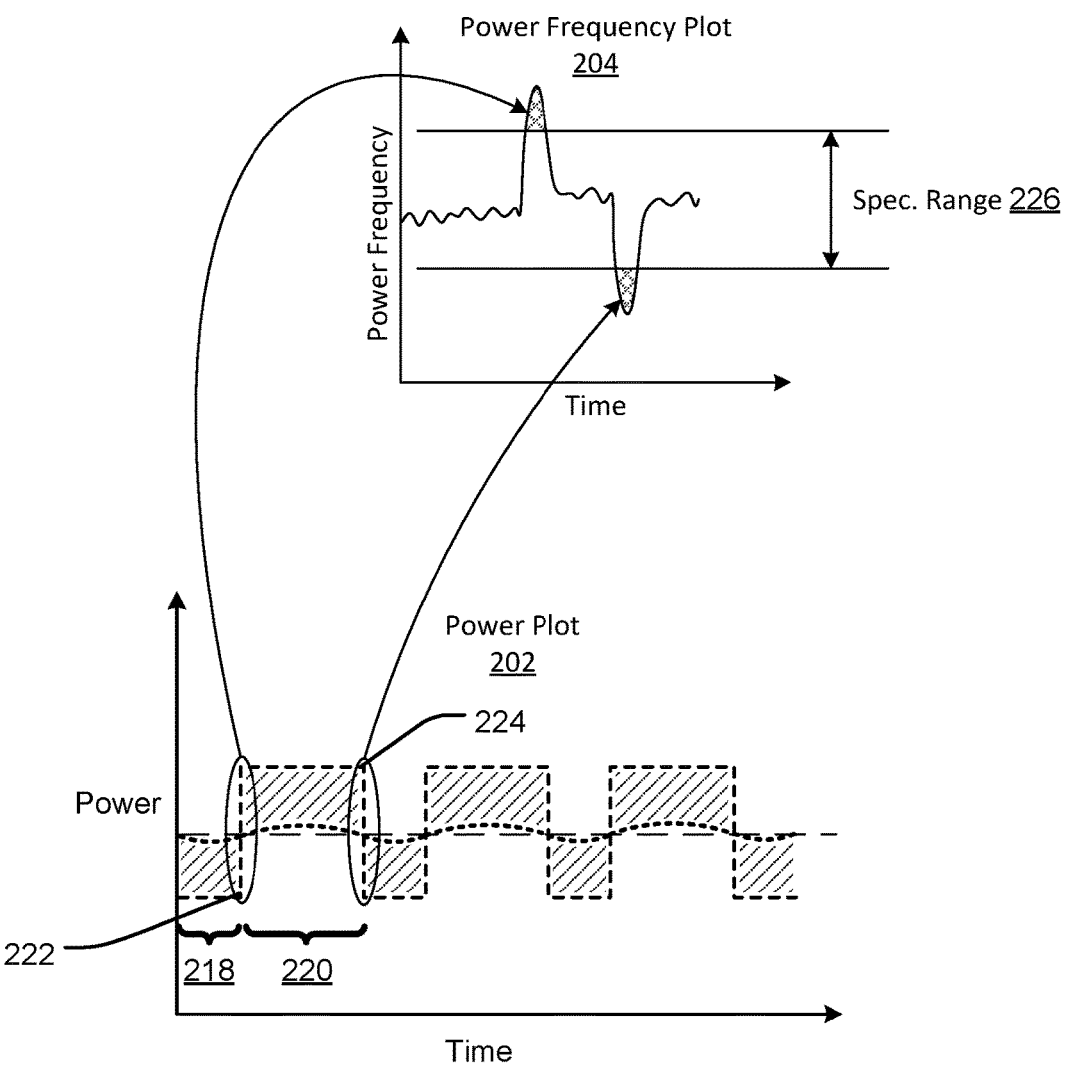
FIG. 2 illustrates an example power plot and an example power frequency plot demonstrating features of the presently described technology.

FIG. 2 illustrates an example power plot 202 and an example power frequency plot 204 demonstrating features of the presently described technology. FIG. 2 also illustrates a legend 206 that indicates graphical representations of a target power consumption 210, a source load 212, a power frequency effect 214, and a smoothed power draw 216. The source load 212 is characterized by a wave amplitude that is significantly reduced in the smoothed power draw 216 due to a smoothing effect of a power stabilizer. Portions of the source load 212 that are canceled due to the smoothing effect are shown in FIG. 2 as smoothed portions 208.

In an implementation of the disclosed technology, including a power stabilizer with components and functionality the same or similar to that described above with respect to FIG. 1, the power stabilizer consumes (inputs) and generates (outputs) power according to a pattern effective to smooth the illustrated power fluctuations in the source load 212 such that power drawn from a primary power source matches exhibits little to no oscillatory behavior, as generally illustrated by the smoothed power draw 216 in FIG. 2.

The power plot 202 illustrates high magnitude oscillations between time periods when the source load 212 is greater than and less than the target power consumption 210. These oscillations can damage or stress equipment. By performing the actions described below, the power stabilizer exchanges power with the power rail to introduce the smoothing effect and generate a smoothed power draw 216 with low magnitude deviations from the target power consumption 210, thereby mitigating the oscillations.

During a first time interval 218, the source load 212 is lower than the target power consumption 210. During this time, the power stabilizer draws smoothing power from the power rail to drive the power draw toward the target power consumption 210. The result is the smoothed power draw 216 during the first time interval 218. At a first time 222, the source load 212 increases to a peak (e.g., because servers are processing complicated operations) above the target power consumption 210. This triggers a switch in the operational mode of the power stabilizer, causing it to output power to the power rail coupled to the source load 212.

During a second time interval 220, the power stabilizer operates in a second directional mode and provides smoothing power to the power rail to drive the power draw toward the target power consumption 210. The result is the smoothed power draw 216 during the second time interval 220. At a second time 224, the source load 212 decreases to a minimum (e.g., at or near zero power draw because the servers have completed the complicated operations) below the target power consumption 210. This triggers another switch in the operational mode of the power stabilizer, causing the power stabilizer to consume power from the power rail coupled to the source load 212 in order to substantially the target power consumption 210 (e.g., as shown by the smoothed power draw 216) during the interval following the second time 224 when the source load 212 is operating at the minimum.

In implementations, the power stabilizer also smooths power (or voltage) frequency fluctuations in the power draw of a power source by exchanging the smoothing power as described above. As illustrated in the power frequency plot 204, the source load 12 is characterized by sharp edges at the first time 222 and the second time 224. These sharp edges correspond to spikes in the power frequency and/or voltage frequency. It can be difficult to compensate for these sharp edges that are almost instantaneous with slow power sources, such as batteries or a generator, because the slow power sources may respond too slowly. The power stabilizer exchanges power with the power rail using a capacitor bank that quickly charges or discharges to smooth out the sharp edges. As illustrated, the smoothing effect of the power stabilizer provides a power frequency effect 214 effective to maintain the power frequency within a specified range 226, mitigating or eliminating negative effects that would otherwise impact the primary power source or other equipment at the first time 222 and the second time 224. For example, if the power provided fails to meet a quick increase in the load, performance will be impacted and delay or destabilize computations. In this way, the power stabilizer effectively operates as a low pass, high pass, or band gap filter to pass power at a low power (or voltage) frequency, at a high power (or voltage) frequency, or within a predefined power (or voltage) frequency range, respectively.

Figure 3:
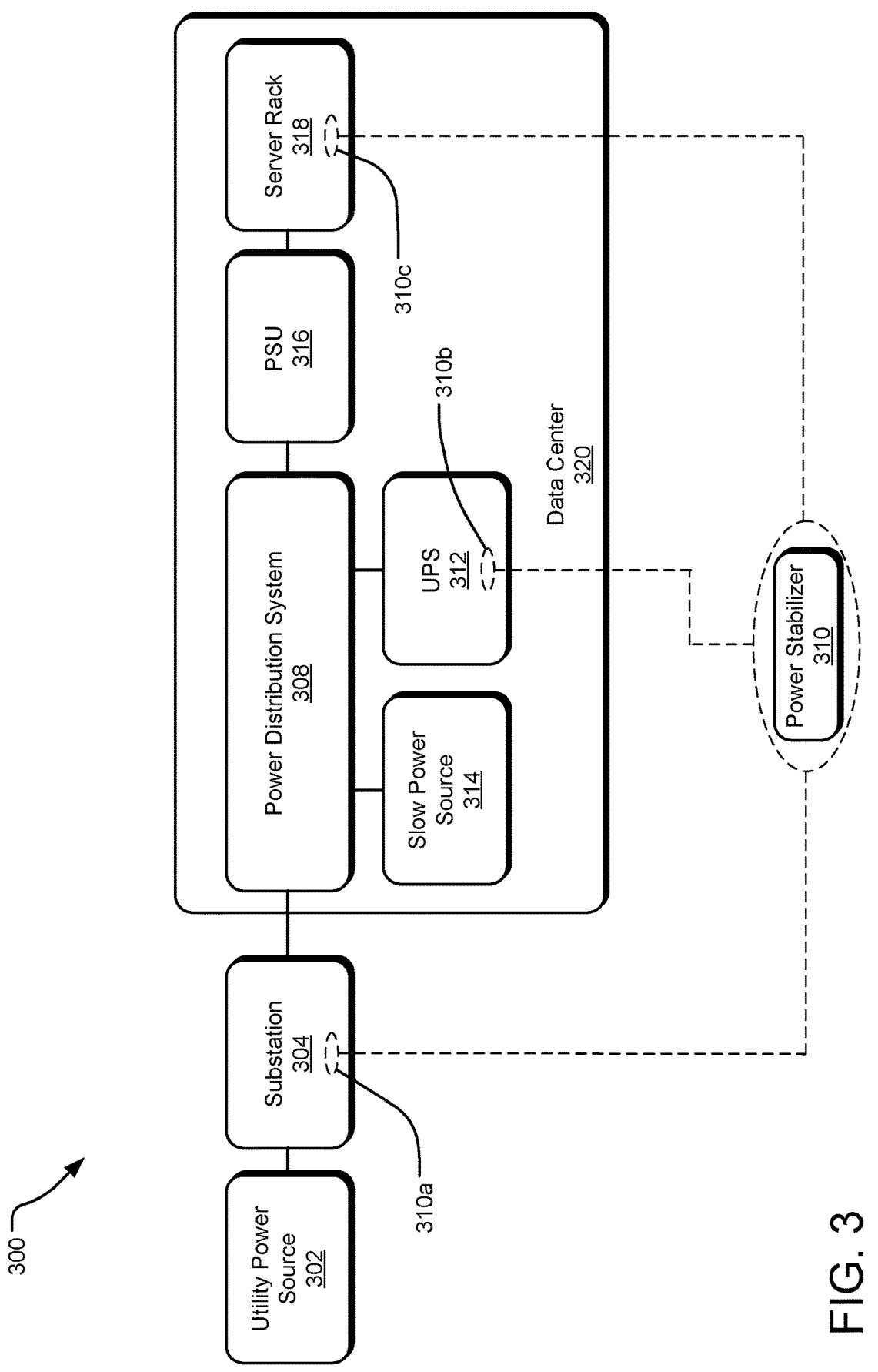
FIG. 3 illustrates an example data center power distribution chain, including different implementations of a power stabilizer.

FIG. 3 illustrates an example data center power distribution chain 300, including different implementations of a power stabilizer 310. In the data center power distribution chain 300, a utility power source 302 exchanges power with a substation 304. In an implementation, the substation 304 includes a transformer configured to modify the voltage of power exchanged between the utility power source 302 and a power distribution system 308 of a data center 320. The power distribution system 308 is electrically coupled to an uninterruptible power supply (UPS) 312 and a slow power source 314. The power distribution system 308 exchanges power between the substation 304 and one or more server power supply units (PSU) 316. The PSU 316 is an internal hardware component of the data center 320. In some implementations, the PSU 316 is configured to convert between alternating current (AC) and direct current (DC) power and/or between voltages (e.g., of different magnitudes and/or frequencies). The PSU 316 exchanges power between a server rack 318 and the power distribution system 308.

When the power supplied to the PSU 316 is insufficient to satisfy the power needs of the PSU 316 (e.g., when the primary power source experiences an outage), the power distribution system draws power from the UPS 312 to allow the PSU 316 to continue functioning or to shut down properly. Implementations are also contemplated in which the UPS 312 includes the slow power source 314. Examples of the UPS 312 include an online, offline, or line interactive UPS. Online UPSs ensure the quality of power remains constant, whereas offline UPSs start running when power is lost, causing a delay when the UPSs ramp up. A line-interactive UPS is a combination of the two and provides greater power supply protection due to the line conditioning of the line-interactive UPS.

At times, a source load at a downstream element of the data center power distribution chain 300 fluctuates, and the presently described technology provides a power stabilizer 310 to help smooth the fluctuations by providing a more consistent power draw from an upstream component. As used herein, the "upstream" direction refers to the direction that is toward the utility power source 302, while the "downstream" refers to the direction of current flow toward source load components (e.g., within the server rack 318). As the current moves downstream away from the utility power source 302, the current is received at the data center 320 and by components within the data center. 320. As demonstrated with dashed lines, FIG. 3 illustrates, without limitation, example locations, including a first location 310a, a second location 310b, and a third location 310c in the data center power distribution chain 300 at which the power stabilizer 310 could be positioned and used to exchange smoothing power to smooth power draw, as generally described above with respect to FIG. 1 and FIG. 2. In some implementations, the power stabilizer 310 is located at one of the first location 310a, second location 310b, or third location 310c. In other implementations, the power stabilizer 310 is located at two or all three of the example locations.

When located at the first location 310a, the power stabilizer 310 is configured to smooth power at the substation 304. In this implementation, the substation 304 includes a transformer (e.g., a solid-state transformer). At the first location 310a, the power stabilizer 310 smooths a source load of the substation 304 that causes a power draw from the utility power source 302. The power stabilizer 310 smooths the power draw from the utility power source 302 by exchanging smoothing power with a power rail in the substation 304. In an implementation, the substation 304 includes a solid-state transformer that is configured to exchange power and convert the power between different voltage frequencies. Smoothing power at the substation 304 allows for easier introduction of the power stabilizer 310 to the data center 320 and reduces space in the data center 320 that would otherwise be occupied by the power stabilizer 310.

When located at the second location 310b, the power stabilizer 310 is configured to smooth power at the UPS 312. The UPS 312 is useable to provide increased power to the PSU 316 when the PSU 316 demands more power than the power distribution system 308 draws from the substation 304. However, the UPS 312 may not be configured to smooth fluctuations in source load. The UPS 312 may include slow power sources, such as a battery bank and/or a generator connected to the Power distribution system 308, that are slow to respond to high-frequency power fluctuations, as described herein. The power stabilizer 310 at the UPS 312 smooths fluctuations in the source load by exchanging power in the UPS 312 and/or the power distribution system 308. Introducing the power stabilizer 310 at the UPS 312 allows for a simpler introduction of the power stabilizer 310 than in the server rack 318 or PSU 316.

When located at the third location 310c, the power stabilizer 310 is configured to smooth power at the server rack 318. For example, the power stabilizer 310 is a component of the server rack 318 or is an adapter or input electrically couplable to a power rail of the server rack 318 or between the server rack 318 and the PSU 316. The server rack 318 generates a source load that causes a power draw from the PSU 316. The power stabilizer 310 smooths the power draw by exchanging smoothing power with the power rail, as described herein. Smoothing the power draw at the server rack 318 that generates the source load provides more refined smoothing of the power draw at the server rack 318 (relative to components upstream thereof), thereby reducing wear on or damage to electrical components upstream of the server rack 318 and/or within the server rack 318 itself, in addition to downstream components.

As mentioned above, the power stabilizer 310 may be located at one or any combination of the first location 310a, second location 310b, and third location 310c. In the various implementations, the control electronics responsible for controlling the mode switch operations may include centralized control electronics for the data center power distribution chain 300, localized control electronics local to each power stabilizer 310, or a combination of centralized and localized control electronics.

Figure 4:
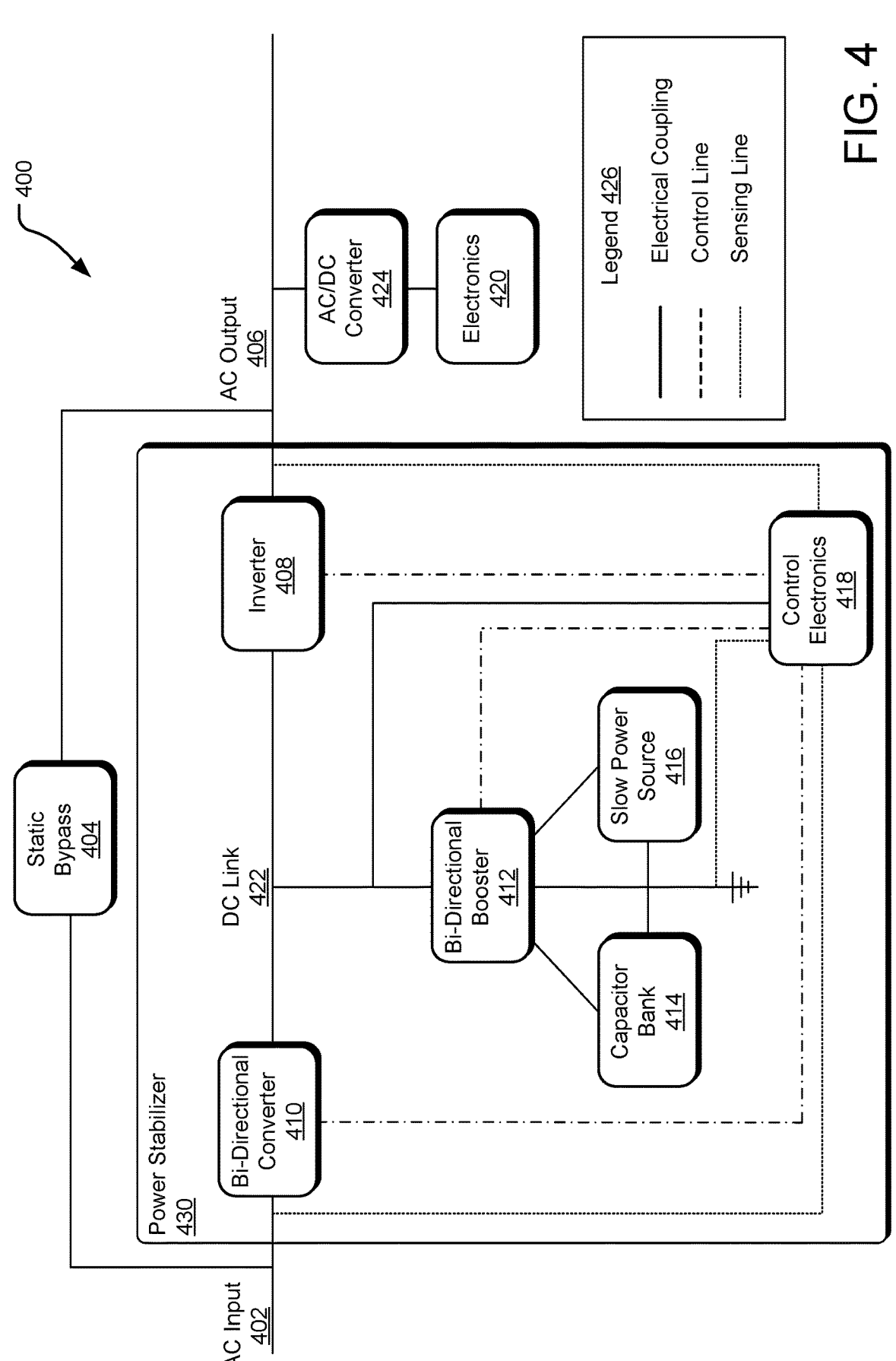
FIG. 4 illustrates a schematic view of an example system for stabilizing power drawn from an alternating current power source due to an alternating current source load.
Figure 5:
FIG. 5 illustrates a schematic view of an example system for stabilizing power drawn using a power stabilizer at a transformer.
Figure 6:
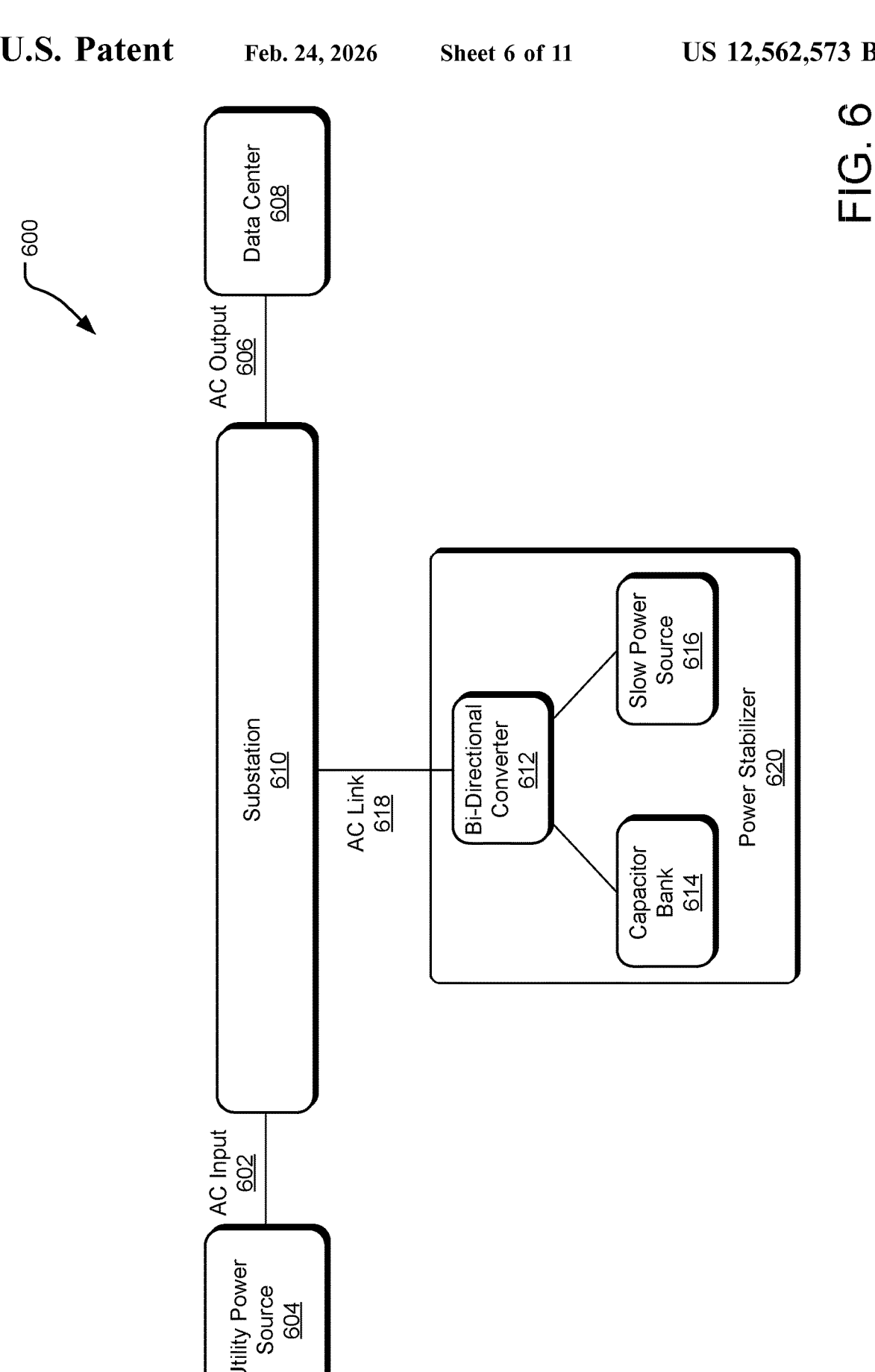
FIG. 6 illustrates a schematic view of an example system for stabilizing power drawn using a power stabilizer at a substation.

Example electronic schematics for a general AC-AC power stabilizer circuit and a general transformer power stabilizer circuit are illustrated in FIGS. 4 and 5, respectively. Example electronic schematics for the implementations in which the power stabilizer is located at the first location 310a, the second location 310b, and the third location 310c are illustrated in FIG. 6., FIG. 7., and FIG. 8, respectively.

FIG. 4 illustrates a schematic view of an example system 400 for using a power stabilizer 430 to stabilize power drawn from an alternating current power source due to an alternating current source load. In the illustrated implementation, the location of the power stabilizer 430 corresponds to the first location 310a in FIG. 3). A legend 426 is provided to describe the connectivity illustrated in the system 400. In a first example implementation, the system 400 couples an AC input 402 fed from a utility power supply to a power distribution system in a data center fed by the AC output 406. The system also includes a static bypass 404 that electrically couples the AC input 402 to the AC output 406.

In the system 400, the AC input 402 from an upstream power source exchanges AC power with a downstream power element that generates an AC load at the AC output 406. Electronics 420 electrically coupled to the AC output 406 by an AC/DC converter 424 generate a source load. In the illustrated implementation, the power stabilizer 430 includes a group of components, including an inverter 408, a bi-directional converter 410, a bi-directional booster 412, a capacitor bank 414, a slow power source 416, and control electronics 418. Implementations are contemplated in which the power stabilizer 430 excludes one or more elements of the group of components. In this implementation, the bi-directional converter 410 includes AC/DC conversion components, such as a rectifier.

The bi-directional converter 410 and the inverter 408 provide a DC link 422 to the bi-directional booster 412. The bi-directional booster 412 modifies the voltage (e.g., magnitude and/or frequency) of the DC-DC connection between the bi-directional converter 410 and one or both of the capacitor bank 414 and the slow power source 416. Implementations are contemplated in which the slow power source 416 is omitted. The bi-directional converter 410 is controlled by control electronics 418. The control electronics 418 determine the smoothing power that the power stabilizer exchanges with the power rail (illustrated as the circuitry between the AC input 402 and the AC output 406). The control electronics 418 controls the smoothing power exchanged by switching the operational modes of the power stabilizer and/or by switching the operational modes of the bi-directional converter 410, as described herein. In this implementation, the power stabilizer can function as a component of a transformer or other AC-AC series power converter. In the implementation, the bi-directional converter 410 can function as an AC-DC converter, such as a rectifier and/or a DC-AC converter.

Other implementations of the power stabilizer are contemplated in which the power stabilizer 430 includes fewer or more components than illustrated. For example, the power stabilizer 430 may include the bi-directional converter 410, the control electronics 718, and/or one or more components selected from a group of a rectifier, the inverter 408, the bi-directional booster 412, the capacitor bank 414, and the slow power source 416. The control and sensing lines illustrated are demonstrative, and other implementations are contemplated. For example, implementations of the control electronics 418 may exercise control over the bi-directional converter 410 and one or more components selected from a group of the rectifier, the inverter 408, the bi-directional booster 412, the capacitor bank 414, and the slow power source 416. Implementations of the control electronics 418 may sense current, power, voltage, or volt-age frequency at one or more positions selected from a group of positions at or between elements described herein.

FIG. 5 illustrates a schematic view of an example system 500 for stabilizing power drawn using a power stabilizer 520 at a transformer 504. The transformer 504 includes transformer circuitry 508 that converts AC power from a first voltage at an AC input 502 to a second voltage experienced at an AC output 506. Between the transformer circuitry 508 and the AC output 506 of the transformer 504, the transformer 504 includes a rectifier 510 and an inverter 512 in series to generate a DC link 514 between the rectifier 510 and the inverter 512. The DC link 514 electrically connects the power stabilizer 520 to the transformer 504. The power stabilizer 520 includes a bi-directional converter 516 configured to exchange smoothing DC power between the transformer 504 and a capacitor bank 518 and/or a slow power source 522 over the DC link 514. The bi-directional converter 516 switches operational modes, including, for example, the herein-described first directional mode and second directional mode. In implementations, the bi-directional converter converts between a first DC voltage and a second DC voltage. Implementations are contemplated in which the transformer 504 includes a solid-state transformer. Using a solid-state transformer provides an advantage in that the solid-state transformer can handle AC voltages at different frequencies between the AC input 502 and the AC output 506 (e.g., by converting between the voltage frequencies). In an implementation, the DC link 514 and power stabilizer 520 may include features similar to the DC link 422 and power stabilizer 430, respectively, in FIG. 4, except that the power stabilizer 520 excludes the rectifier of the bi-directional converter 410 and the inverter 408 as illustrated.

FIG. 6 illustrates a schematic view of an example system 600 for stabilizing power drawn using a power stabilizer 620 at a substation 610. The substation is electrically coupled to a utility power source 604 at an AC input 602 and is electrically coupled to a data center 608 at an AC output 606. In the illustrated implementation, the substation 610 includes circuitry to convert the AC input 602 and the AC output 606 between AC power and DC power to provide an AC link 618 to the power stabilizer 620. The bi-directional converter 612 is configured as an AC-DC converter that converts AC power exchanged over the AC link 618 between AC power and DC power. In implementations, the bi-directional converter 612 additionally, or alternatively, steps up or down the voltage of the smoothing power exchanged between the power stabilizer 620 and the substation 610. The power stabilizer 620 includes a bi-directional converter 612 configured to exchange smoothing DC power between the substation and one or both of a capacitor bank 614 and/or a slow power source 616 over the DC link 514. The bi-directional converter 612 switches operational modes, including, for example, the herein-described first directional mode and second directional mode. In the illustrated implementation, the power stabilizer 620 includes the capacitor bank 614 and the slow power source 616, but implementations are contemplated in which one or both of the capacitor bank 614 and/or the slow power source 616 are external and electrically connected to the power stabilizer 620. Implementations are contemplated in which the substation 610 includes a solid-state transformer, as described herein.

Figure 7:
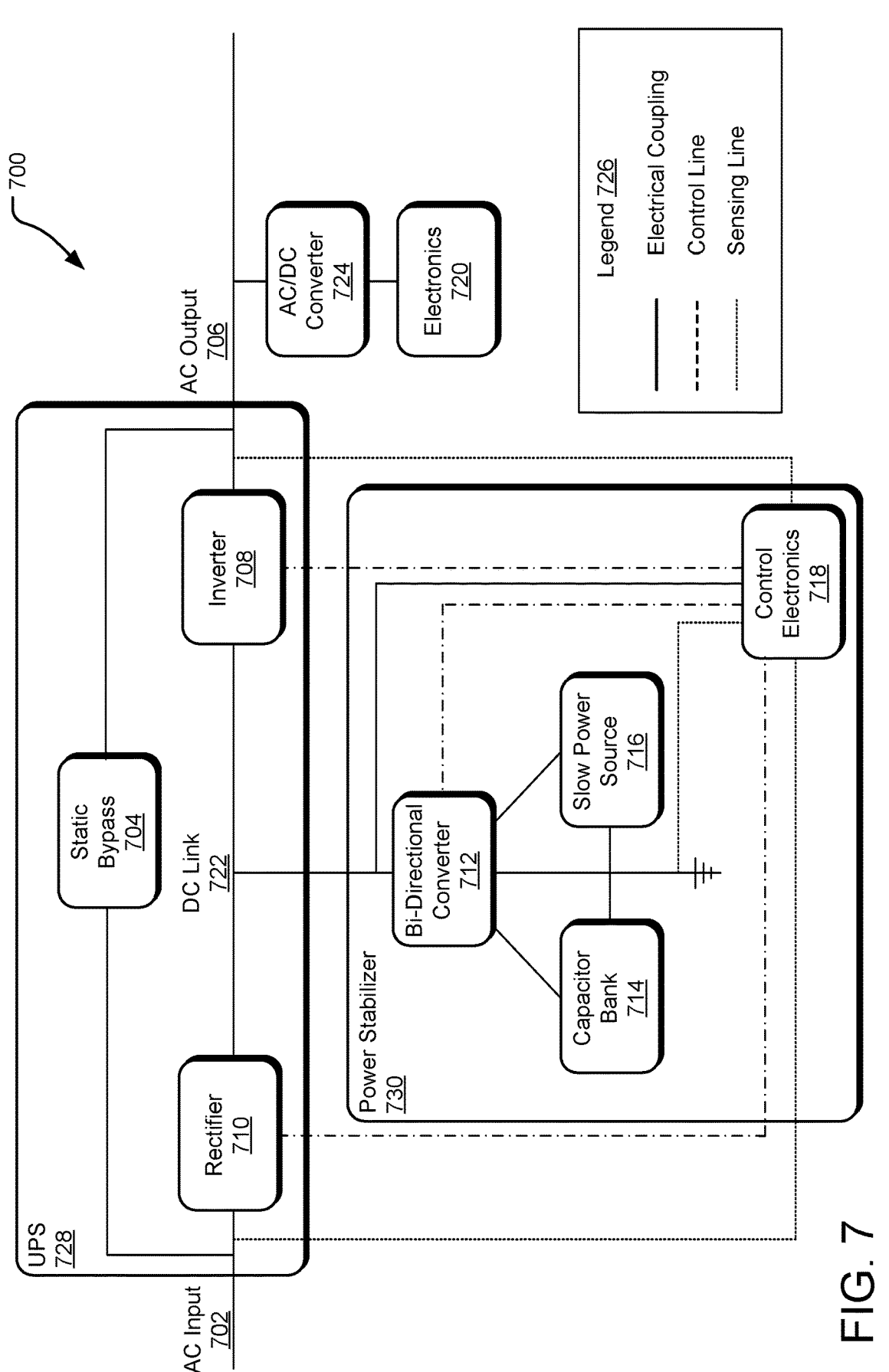
FIG. 7 illustrates a schematic view of an example system for stabilizing power drawn using a power stabilizer at an uninterruptible power supply (UPS).

FIG. 7 illustrates a schematic view of an example system 700 stabilizing power drawn using a power stabilizer 730 located at an uninterruptible power supply (UPS). In one implementation, the illustrated location of the power stabilizer 730 corresponds to the second location 310b in FIG. 3. FIG. 7 includes a legend 726 describing an example of the connectivity of elements. In an implementation, an AC input 702 and an AC output 706 represent terminals of a power distribution system of a data center. The AC input 702 and AC output 706 are connected by a static bypass 704 and, in a parallel connection, to a rectifier 710 and an inverter 708 that provide a DC Link 722. The UPS 728 is configured to exchange DC power at the DC Link 722. Control electronics 718 of the power stabilizer 730 are configured to instruct the bi-directional converter 712 to conduct mode switch operations, as described herein, to direct or cease current transmission between the DC Link 722 and one or both of a capacitor bank 714 and a slow power source 716. Although illustrated as elements of the power stabilizer 730, implementations are contemplated in which one or both of the capacitor bank 714 and the slow power source 716 are external to and/or controllable by the power stabilizer 730. The mode-switch operations smooth fluctuations in a source load experienced at an AC output 706 based on operations of electronics 720. The power exchanged with the electronics 720 is converted between AC and DC by an AC/DC converter 724.

Figure 8:
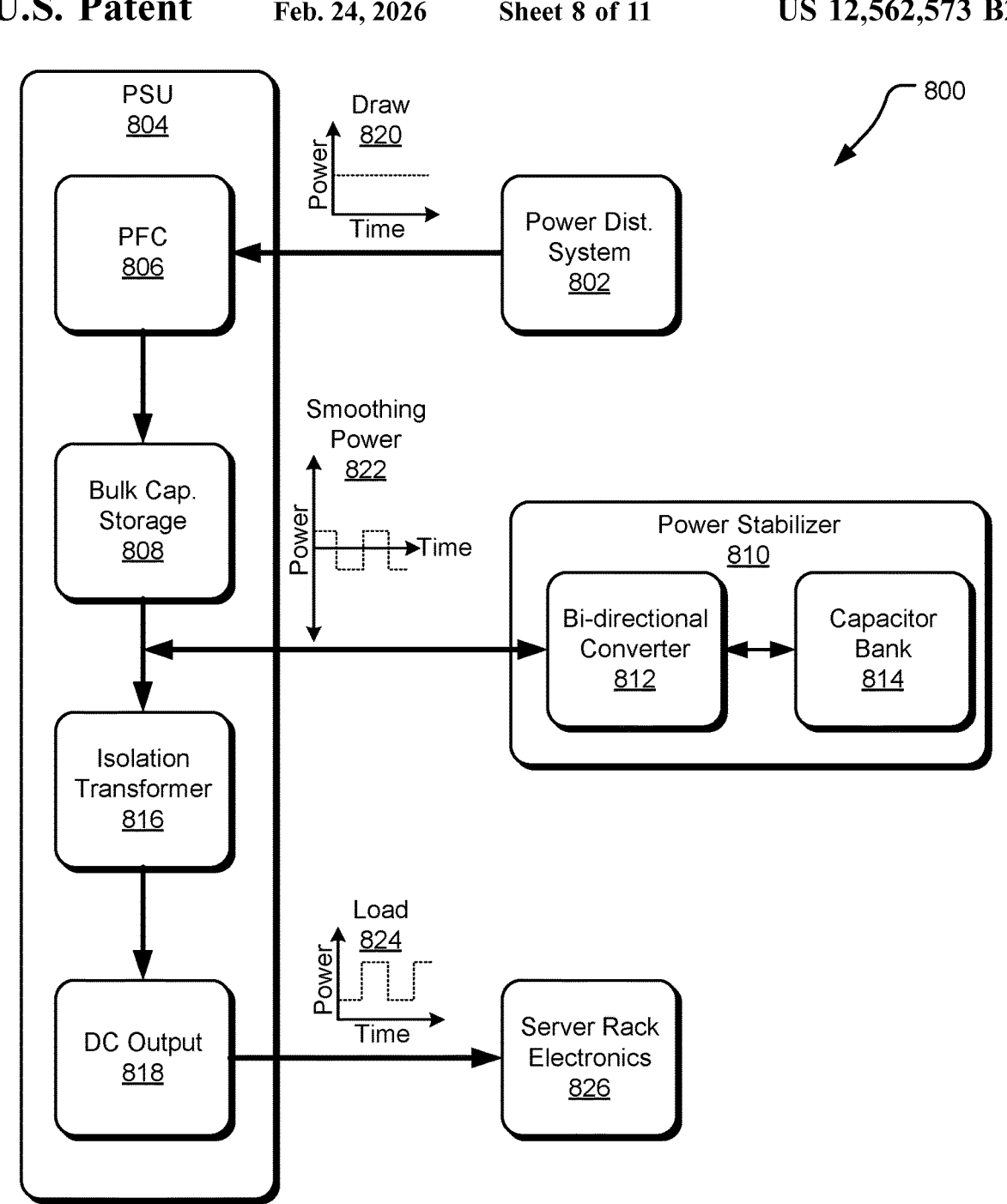
FIG. 8 illustrates a schematic view of an example system for stabilizing power drawn using a power stabilizer in a server rack.

FIG. 8 illustrates a schematic view of an example system 800 for stabilizing power drawn using a power stabilizer 810 coupled to server rack electronics 826 arranged within a server rack (not shown). In one implementation, the location of the power stabilizer 810 corresponds to the third location 310c shown in FIG. 3. The server rack includes server rack electronics 826 that generate a source load 824, and a power supply unit (PSU) 804 of the system 800 draws current corresponding to a power draw 820 from a power distribution system 802 of the data center to satisfy the source load 824. The power stabilizer 810 switches the operational modes of a bi-directional converter 812 to exchange smoothing power 822 with a capacitor bank 814, as described herein. The smoothing power 822 smooths oscillations in the source load 108 such that the power draw 820 (the actual power drawn) is consistent with a target power consumption.

In an implementation, the source load 824 includes fluctuations that can deplete or overcharge a bulk capacitance storage unit 808 in the PSU 804. The power supply unit includes a power factor correction circuit (PFC) 806. The PFC 806 can compensate for fluctuations in leading and lagging current to drive the voltage on a bulk capacitance storage unit 808 towards a target voltage but may be insufficient to smooth fluctuations in the source load 824. In an implementation, the source load 824 is large enough to drive the current through the bulk capacitance storage unit 808 away from a target current, and the power stabilizer 810 compensates by exchanging the smoothing power 822 to drive the current through the bulk capacitance storage unit 808 towards the target current. The PSU 804 is electrically coupled to the server rack electronics by a DC output 818 to generate DC voltage. The system 800 includes an isolation transformer 816 configured for connecting circuits at different potentials, for galvanic isolation, and/or for voltage transformation.

Other implementations of control are contemplated. For example, to reduce the amount of storage necessary in the rack level energy storage, the voltage level on the capacitor bank 814 could be modified to be high when the source load 824 is low (e.g., below the target power consumption) and to be low when the source load 824 is high (e.g., above the target power consumption). This control stores more energy available in the capacitor bank 814 for delivery if the load should suddenly increase, and conversely, more room for energy storage in the capacitor bank 814 should the source load 824 decrease suddenly. Implementations are considered in which the system provides a non-correction dead-band or hysteresis in the sensing of the current flow from the bulk primarily to prevent simultaneous charging and discharging of the capacitor bank 814 (e.g., using transistors connected in opposite directions) if the solid state devices of the PSU 804 change with environmental conditions (e.g., temperature or pressure) to account for real-world operation. In an implementation, the bi-directional converter 812 is configured to adapt to the voltage on the bus connecting the bulk capacitance storage unit 808 to the DC output 818 as the voltage in the bulk capacitance storage unit 808 changed, which can be done with pulse width modulation.

Figure 9:
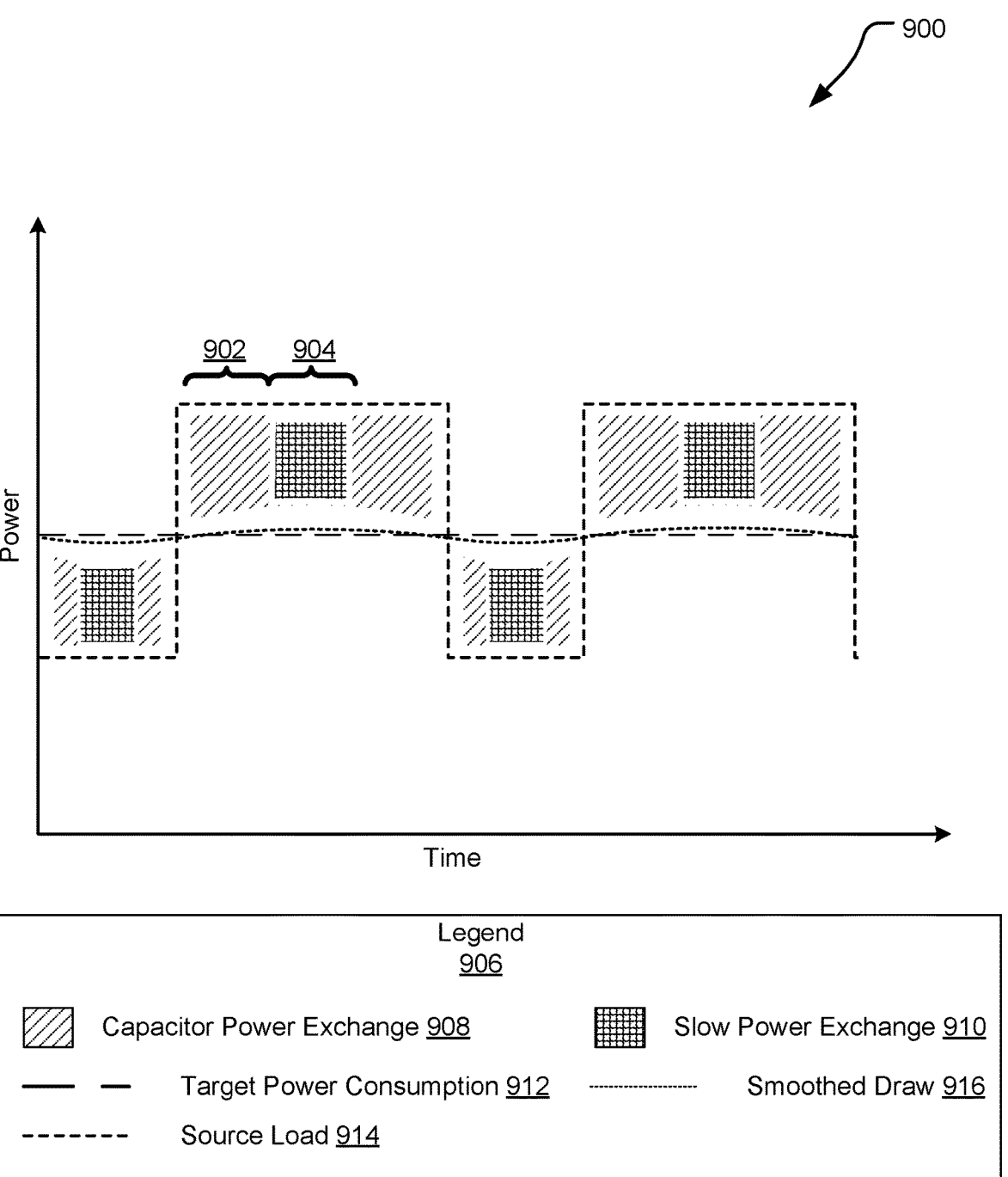
FIG. 9 illustrates an example power plot of a system that smooths a source load using a power stabilizer that exchanges smoothing power between a power rail and both a capacitor bank and a slow power source.

FIG. 9 illustrates an example power plot 900 of a system that smooths oscillations in a source load using a power stabilizer. The power stabilizer exchanges smoothing power between a power rail using both a capacitor bank and a slow power source, such as in the manner shown and described with respect to FIG. 8 and FIG. 7. FIG. 9 includes a legend 906 describing elements of the power plot 900. Consistent with other implementations described herein, the power stabilizer is coupled to a power rail attached to source load electronics and is configured to exchange smoothing power (e.g., selectively output power to or consume power from the power rail) to drive power consumption from a power source toward a target. The smoothing power (e.g., consumption of power or output of power) can be selectively driven by either a capacitor bank for fast, high-frequency smoothing or by a slow power source for slow, sustained smoothing.

During a first predefined time interval 902 (e.g., encompassing a predefined number of collected samples), the power stabilizer uses capacitor power exchange 908, which refers to power output from or consumed by a capacitor bank, to compensate for fluctuations in a source load 914 by driving power drawn towards a target power consumption 912 to generate a smoothed draw 916.

During a second duration 904, the power stabilizer uses slow power exchange 910, which refers to power output from or consumed by a slow power source, to compensate for the source load 914 and generate the smoothed draw 916. In an implementation, the slow power source may be triggered to exchange power when the capacitor bank is approaching a limit of a predefined charge range. Although not illustrated, the power stabilizer may exchange smoothing power using both the capacitor bank and the slow power sources (e.g., contemporaneously). For example, the use of both the capacitor bank and the slow storage could be triggered by the satisfaction of a mode switch condition, but because the slow storage is slow to ramp up, the capacitor bank exchanges the smoothing power in decreasing amounts to account for the ramp-up of the slow power source. The control circuitry could control the distribution of the magnitude and properties (e.g., current, voltage, or voltage frequency) of power exchanged with the capacitor bank and power exchanged with the slow power source to total a target power exchanged. For example, the power exchanged with the capacitor bank would decrease with an increase in the power exchanged by the slow power source while maintaining a magnitude and/or one or more properties of smoothing power exchanged.

Figure 10:
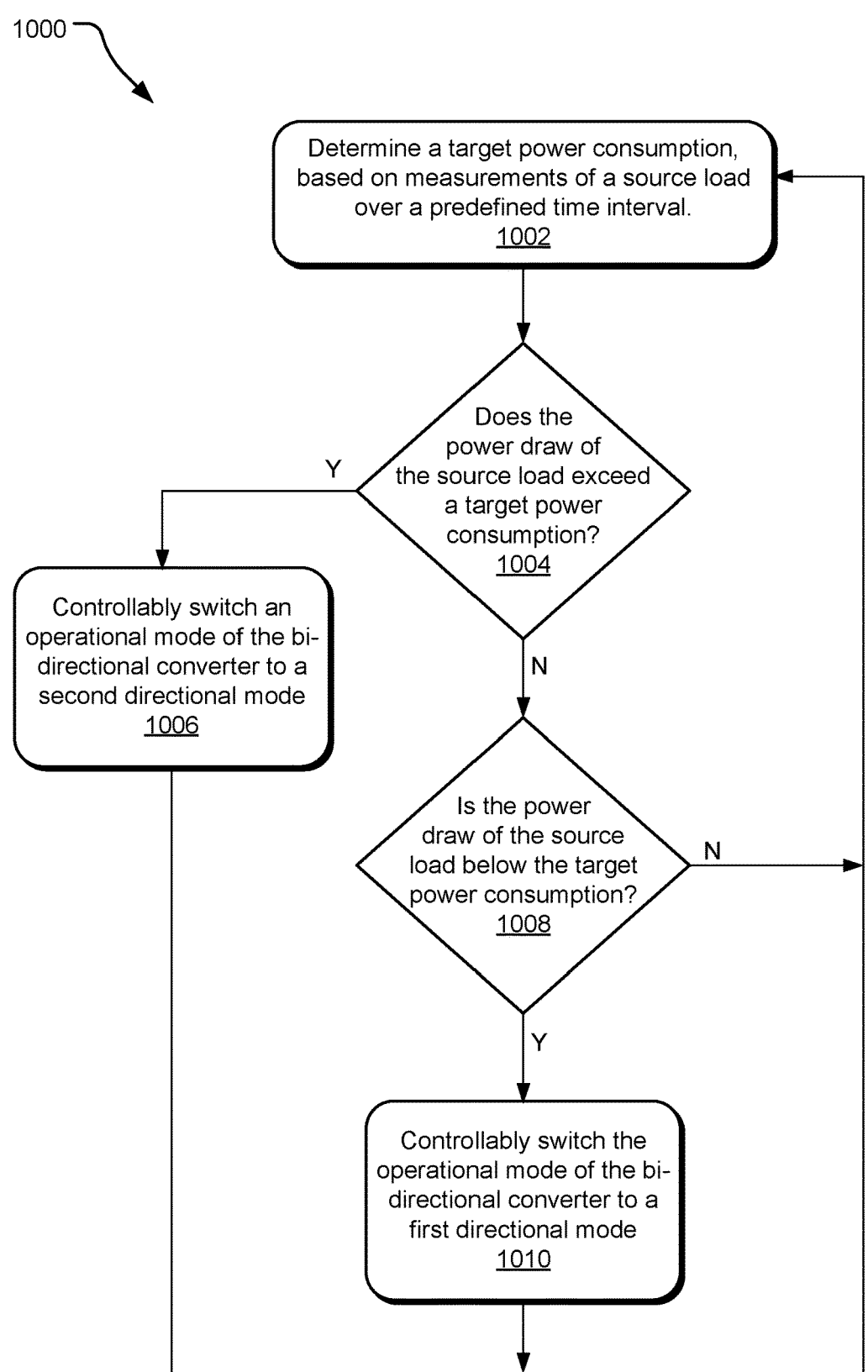
FIG. 10 illustrates example operations for stabilizing power drawn from a power source in a computing system.

FIG. 10 illustrates example operations 1000 for stabilizing power drawn from a power source in a computing system. In implementations, the operations 1000 are conducted by one or more power stabilizers coupled to one or more components of a data center power distribution chain, as described herein.

A determining operation 1002 determines a target power consumption of a source load over a predefined time interval. The source load is generated by electronics supplied power by the primary power source through a power rail. The power rail is electrically coupled to a capacitor bank by a bi-directional converter. In an implementation, the determining operation 1002 determines the target power consumption by computing a running average of the source load over the predefined time interval. The target power consumption functions as a target power draw to which the power stabilizer drives the drawn power to smooth an erratic source load.

A first decision block 1004 determines whether the power draw of the source load exceeds a target power consumption. If ("Y") the power draw of the source load exceeds a target power consumption (e.g., in satisfaction of a first mode switch condition), the operations 1000 proceed to a first controllable switching operation 1006. Otherwise ("N"), the operations 1000 proceed to a second decision block.

The first controllable switching operation 1006 controllably switches an operational mode of the bi-directional converter to a second directional mode. The bi-directional converter is configured to direct current released from the capacitor bank to the power rail when operating in the second directional mode. After the operations 1000 switch the operation mode of the bi-directional converter to the second directional mode, the operations 1000 return to the determining operation 1002.

The second decision block 1008 determines whether power draw of the source load is below the target power consumption. If ("Y") the power draw of the source load is below the target power consumption (e.g., in satisfaction of a first mode switch condition), the operations 1000 proceed to a second controllable switching operation 1010. Otherwise ("N"), the operations 1000 return to the determining operation 1002.

The second controllable switching operation 1010 controllably switches the operational mode of the bi-directional converter to a first directional mode. The bi-directional converter is configured to direct current from the power rail into the capacitor bank when operating in the first directional mode. After the operations 1000 switch the operational mode of the bi-directional converter to the first directional mode, the operations 1000 return to the determining operation 1002.

Although illustrated as sequential, the timing of the determining operation 1002 may be independent of the timing of the first decision block 1004, the first controllable switching operation 1006, the second decision block 1008, and/or the second controllable switching operation 1010. For example, the determining operation 1002 may occur at predefined intervals or in response to a stimulus (e.g., a detected change based on measurements of a source load).

Although not illustrated, in implementations, the mode switch operations further include controllably switching operational modes based on the satisfaction of a mode switch condition (e.g., other than exceeding or dropping below a target power consumption), controllably switching to an inactive mode based on the source load falling within a non-correction dead-band, or switching to a charge preservation mode in response to detecting that the charge of a capacitor bank is outside of a predefined charged range, as described herein. Implementations are contemplated in which the first and second directional modes further exchange smoothing power from a slow power source, as described herein.

Figure 11:
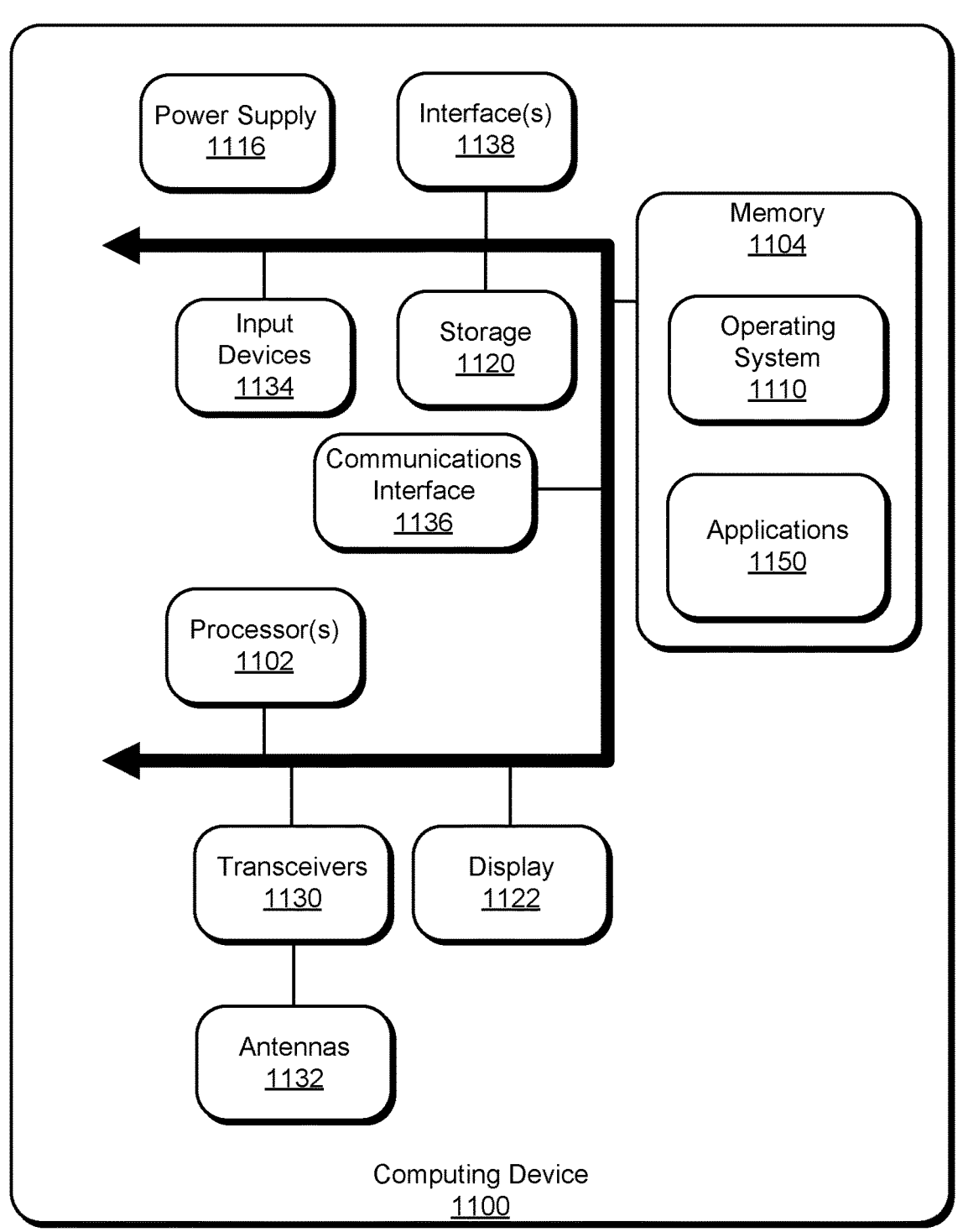
FIG. 11 illustrates an example computing device for use in implementing the described technology.

FIG. 11 illustrates an example computing device 1100 for use in implementing the described technology. The computing device 1100 may be a client computing device (such as a laptop computer, a desktop computer, or a tablet computer), a server/cloud computing device, an Internet-of-Things (IoT), any other type of computing device, or a combination of these options. The computing device 1100 includes one or more processor(s) 1102 and a memory 1104. The memory 1104 generally includes both volatile memory (e.g., RAM) and nonvolatile memory (e.g., flash memory), although one or the other type of memory may be omitted. An operating system 1110 resides in the memory 1104 and is executed by the processor(s) 1102. In some implementations, the computing device 1100 includes and/or is communicatively coupled to storage 1120.

In the example computing device 1100, as shown in FIG. 11, one or more modules or segments, such as applications 1150 and other program code and modules, are loaded into the operating system 1110 on the memory 1104 and/or the storage 1120 and executed by the processor(s) 1102. The storage 1120 may store a first operational mode, a second operational mode, a predefined charge range, a target power consumption (e.g., target value or range of values), a mode switch condition, and other data and be local to the computing device 1100 or may be remote and communicatively connected to the computing device 1100. In particular, in one implementation, components of a system for stabilizing power drawn from a primary power source in a computing system, including a bi-directional converter and control circuitry, may be implemented entirely in hardware or in a combination of hardware circuitry and software.

The computing device 1100 includes a power supply 1116, which may include or be connected to one or more batteries or other power sources and which provides power to other components of the computing device 1100. The power supply 1116 may also be connected to an external power source that overrides or recharges the built-in batteries or other power sources.

The computing device 1100 may include one or more communication transceivers 1130, which may be connected to one or more antenna(s) 1132 to provide network connectivity (e.g., mobile phone network, Wi-Fi®, Bluetooth®) to one or more other servers, client devices, IoT devices, and other computing and communications devices. The computing device 1100 may further include a communications interface 1136 (such as a network adapter or an I/O port, which are types of communication devices). The computing device 1100 may use the adapter and any other types of communication devices for establishing connections over a wide-area network (WAN) or local-area network (LAN). It should be appreciated that the network connections shown are exemplary and that other communications devices and means for establishing a communications link between the computing device 1100 and other devices may be used.

The computing device 1100 may include one or more input devices 1134 such that a user may enter commands and information (e.g., a keyboard, trackpad, or mouse). These and other input devices may be coupled to the server by one or more interfaces 1138, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 1100 may further include a display 1122, such as a touchscreen display.

The computing device 1100 may include a variety of tangible processor-readable storage media and intangible processor-readable communication signals. Tangible processor-readable storage can be embodied by any available media that can be accessed by the computing device 1100 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1100. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method for stabilizing power draw from a primary power source in a computing system, the method comprising: determining a target power consumption, based on measurements of a source load over a predefined time interval, the source load being generated by electronics supplied power by the primary power source through a power rail, the power rail being electrically coupled to a capacitor bank by a bi-directional converter; and smoothing fluctuations in power drawn from the primary power source by selectively performing mode switch operations, the mode switch operations including: controllably switching an operational mode of the bi-directional converter to a second directional mode in response to detecting that the source load exceeds the target power consumption, the bi-directional converter being configured to direct current released from the capacitor bank to the power rail when operating in the second directional mode; and controllably switching the operational mode of the bi-directional converter to a first directional mode in response to detecting that the source load has dropped below the target power consumption, the bi-directional converter being configured to direct current from the power rail into the capacitor bank when operating in the first directional mode.

Clause 2. The method of clause 1, wherein the power rail is configured as a component of a server rack, the power rail is configured to supply power to the server rack, and the smoothing operation smooths the power drawn by the server rack from the primary power source.

Clause 3. The method of clause 1, wherein the power rail is configured as a component of an uninterruptible power supply (UPS), the UPS is configured to supply power to a power supply unit (PSU) of a server through the power rail, and the smoothing operation smooths the power drawn by the UPS.

Clause 4. The method of clause 1, wherein the power rail is configured as a component of a transformer substation, the transformer substation is configured to exchange power between a utility provider and a data center power distribution system through the power rail, and operation of smoothing smooths the power drawn by the data center power distribution system from the utility provider.

Clause 5. The method of clause 1, wherein the mode switch operations further include: responsive to determining that a charge stored by the capacitor bank is outside of a predefined charge range, controllably switching the operational mode of the bi-directional converter to a charge preservation mode in which the bi-directional converter is configured to control current exchanged between the capacitor bank and the power rail to drive the charge stored to be within the predefined charge range.

Clause 6. The method of clause 1, wherein the bi-directional converter is electrically couplable to a slow power source, the slow power source including a battery or a power generator, wherein the bi-directional converter is further configured to direct current from the slow power source into the capacitor bank when operating in the first directional mode and to direct current released from the slow power source to the power rail when operating in the second directional mode.

Clause 7. The method of clause 1, wherein the target power consumption includes a running average of the source load over the predefined time interval.

Clause 8. A power stabilizer, comprising: a bi-directional converter electrically couplable to a power rail and a capacitor bank, the bi-directional converter configured to direct current from the power rail into the capacitor bank when operating in a first directional mode and to direct current released from the capacitor bank to the power rail when operating in a second directional mode, the power rail being configured to supply power from a primary power source to electronics that generate a source load; and control circuitry configured to: determine a target power consumption based on measurements of the source load over a predefined time interval; and smooth fluctuations in power drawn from the primary power source by selectively performing mode switch operations, the mode switch operations including: controllably switching an operational mode of the bi-directional converter to the second directional mode in response to detecting that the source load exceeds a target power consumption; and controllably switching the operational mode of the bi-directional converter to the first directional mode in response to detecting that the source load has dropped below the target power consumption.

Clause 9. The power stabilizer of clause 8, wherein the power rail is configured as a component of a server rack, the power rail is configured to supply power to the server rack, and the control circuitry is configured to smooth the power drawn by the server rack from the primary power source.

Clause 10. The power stabilizer of clause 8, wherein the power rail is configured as a component of an uninterruptible power supply (UPS), the UPS is configured to supply power to a power supply unit (PSU) of a server through the power rail, and the control circuitry is configured to smooth the power drawn by the UPS.

Clause 11. The power stabilizer of clause 8, wherein the power rail is configured as a component of a transformer substation, the transformer substation is configured to exchange power between a utility provider and a data center power distribution system through the power rail, and the control circuitry is configured to smooth the power drawn by the data center power distribution system from the utility provider.

Clause 12. The power stabilizer of clause 8, wherein the mode switch operations further include: responsive to determining that a charge stored by the capacitor bank is outside of a predefined charge range, controllably switching the operational mode of the bi-directional converter to a charge preservation mode, wherein the bi-directional converter is configured in the charge preservation mode to control current exchanged between the capacitor bank and the power rail to drive the charge stored to be within the predefined charge range.

Clause 13. The power stabilizer of clause 8, wherein the bi-directional converter is electrically couplable to a slow power source, the slow power source including a battery or a power generator, wherein the bi-directional converter is further configured to direct current from the slow power source into the capacitor bank when operating in the first directional mode and to direct current released from the slow power source to the power rail when operating in the second directional mode.

Clause 14. The power stabilizer of clause 8, wherein the target power consumption includes a running average of the source load over the predefined time interval.

Clause 15. One or more tangible processor-readable storage media embodied with instructions for executing on one or more processors and circuits of a computing device a process of stabilizing power draw from a primary power source in a computing system, the process comprising: determining a target power consumption based on measurements of a source load over a predefined time interval, the source load being generated by electronics supplied power by the primary power source through a power rail, the power rail electrically coupled to a capacitor bank by a bi-directional converter; and smoothing fluctuations in power drawn from the primary power source by selectively performing mode switch operations, the mode switch operations including: controllably switching an operational mode of the bi-directional converter to a second directional mode in response to detecting that the source load exceeds the target power consumption, the bi-directional converter being configured to direct current released from the capacitor bank to the power rail when operating in the second directional mode; and controllably switching the operational mode of the bi-directional converter to a first directional mode in response to detecting that the source load has dropped below the target power consumption, the bi-directional converter being configured to direct current from the power rail into the capacitor bank when operating in the first directional mode.

Clause 16. The one or more tangible processor-readable storage media of clause 15, wherein the power rail is configured as a component of a server rack, the power rail is configured to supply power to the server rack, and the smoothing operation smooths the power drawn by the server rack from the primary power source.

Clause 17. The one or more tangible processor-readable storage media of clause 15, wherein the power rail is configured as a component of an uninterruptible power supply (UPS), the UPS is configured to supply power to a power supply unit (PSU) of a server through the power rail, and the smoothing operation smooths the power drawn by the UPS.

Clause 18. The one or more tangible processor-readable storage media of clause 15, wherein the power rail is configured as a component of a transformer substation, the transformer substation is configured to exchange power between a utility provider and a data center power distribution system through the power rail, and operation of smoothing smooths the power drawn by the data center power distribution system from the utility provider.

Clause 19. The one or more tangible processor-readable storage media of clause 15, wherein the mode switch operations further include: responsive to determining that a charge stored by the capacitor bank is outside of a predefined charge range, controllably switching the operational mode of the bi-directional converter to a charge preservation mode in which the bi-directional converter is configured to control current exchanged between the capacitor bank and the power rail to drive the charge stored to be within the predefined charge range.

Clause 20. The one or more tangible processor-readable storage media of clause 15, wherein the target power consumption includes a running average of the source load over the predefined time interval. Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax for instructing a computer to perform a certain operation segment. The instructions may be implemented using any suitable high-level, low-level, object-oriented, visual, compiled, and/or interpreted programming language.

An example system for stabilizing power draw from a primary power source in a computing system is provided, including means for determining a target power consumption, based on measurements of a source load over a predefined time interval, the source load being generated by electronics supplied power by the primary power source through a power rail, the power rail being electrically coupled to a capacitor bank by a bi-directional converter and means for smoothing fluctuations in power drawn from the primary power source by selectively performing mode switch operations. The mode switch operations include controllably switching an operational mode of the bi-directional converter to a second directional mode in response to detecting that the source load exceeds the target power consumption. The bi-directional converter being configured to direct current released from the capacitor bank to the power rail when operating in the second directional mode. The mode switching operations further include controllably switching the operational mode of the bi-directional converter to a first directional mode in response to detecting that the source load has dropped below the target power consumption, the bi-directional converter being configured to direct current from the power rail into the capacitor bank when operating in the first directional mode.

Another example system of any preceding system is provided, wherein the power rail is configured as a component of a server rack, the power rail is configured to supply power to the server rack, and the means for smoothing smooth the power drawn by the server rack from the primary power source.

Another example system of any preceding system is provided, wherein the power rail is configured as a component of an uninterruptible power supply (UPS), the UPS is configured to supply power to a power supply unit (PSU) of a server through the power rail, and the means for smoothing smooth the power drawn by the UPS.

Another example system of any preceding system is provided, wherein the power rail is configured as a component of a transformer substation, the transformer substation is configured to exchange power between a utility provider and a data center power distribution system through the power rail, and means for smoothing smooth the power drawn by the data center power distribution system from the utility provider.

Another example system of any preceding system is provided, wherein the mode switch operations further include, responsive to determining that a charge stored by the capacitor bank is outside of a predefined charge range, controllably switching the operational mode of the bi-directional converter to a charge preservation mode in which the bi-directional converter is configured to control current exchanged between the capacitor bank and the power rail to drive the charge stored to be within the predefined charge range.

Another example system of any preceding system is provided, wherein the bi-directional converter is electrically couplable to a slow power source, the slow power source including a battery or a power generator, wherein the bi-directional converter is further configured to direct current from the slow power source into the capacitor bank when operating in the first directional mode and to direct current released from the slow power source to the power rail when operating in the second directional mode.

Another example system of any preceding system is provided, wherein the target power consumption includes a running average of the source load over the predefined time interval.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method for stabilizing power draw from a primary power source in a computing system, the method comprising:

determining a target power consumption, based on measurements of a source load over a predefined time interval, the source load being generated by electronics supplied power by the primary power source through a power rail, the power rail being electrically coupled to a capacitor bank by a bi-directional converter; and smoothing fluctuations in power drawn from the primary power source by selectively performing mode switch operations, the mode switch operations including:

controllably switching an operational mode of the bi-directional converter to a second directional mode in response to detecting that the source load exceeds the target power consumption, the bi-directional converter being configured to direct current released from the capacitor bank to the power rail when operating in the second directional mode; and controllably switching the operational mode of the bi-directional converter to a first directional mode in response to detecting that the source load has dropped below the target power consumption, the bi-directional converter being configured to direct current from the power rail into the capacitor bank when operating in the first directional mode.

2. The method of claim 1, wherein the power rail is configured as a component of a server rack, the power rail is configured to supply power to the server rack, and the smoothing operation smooths the power drawn by the server rack from the primary power source.

3. The method of claim 1, wherein the power rail is configured as a component of an uninterruptible power supply (UPS), the UPS is configured to supply power to a power supply unit (PSU) of a server through the power rail, and the smoothing operation smooths the power drawn by the UPS.

4. The method of claim 1, wherein the power rail is configured as a component of a transformer substation, the transformer substation is configured to exchange power between a utility provider and a data center power distribution system through the power rail, and operation of smoothing smooths the power drawn by the data center power distribution system from the utility provider.

5. The method of claim 1, wherein the mode switch operations further include:

responsive to determining that a charge stored by the capacitor bank is outside of a predefined charge range, controllably switching the operational mode of the bi-directional converter to a charge preservation mode in which the bi-directional converter is configured to control current exchanged between the capacitor bank and the power rail to drive the charge stored to be within the predefined charge range.

6. The method of claim 1, wherein the bi-directional converter is electrically couplable to a slow power source, the slow power source including a battery or a power generator, wherein the bi-directional converter is further configured to direct current from the slow power source into the capacitor bank when operating in the first directional mode and to direct current released from the slow power source to the power rail when operating in the second directional mode.

7. The method of claim 1, wherein the target power consumption includes a running average of the source load over the predefined time interval.

8. A power stabilizer, comprising:

a bi-directional converter electrically couplable to a power rail and a capacitor bank, the bi-directional converter configured to direct current from the power rail into the capacitor bank when operating in a first directional mode and to direct current released from the capacitor bank to the power rail when operating in a second directional mode, the power rail being configured to supply power from a primary power source to electronics that generate a source load; and control circuitry configured to:

determine a target power consumption based on measurements of the source load over a predefined time interval; and smooth fluctuations in power drawn from the primary power source by selectively performing mode switch operations, the mode switch operations including:

controllably switching an operational mode of the bi-directional converter to the second directional mode in response to detecting that the source load exceeds a target power consumption; and controllably switching the operational mode of the bi-directional converter to the first directional mode in response to detecting that the source load has dropped below the target power consumption.

9. The power stabilizer of claim 8, wherein the power rail is configured as a component of a server rack, the power rail is configured to supply power to the server rack, and the control circuitry is configured to smooth the power drawn by the server rack from the primary power source.

10. The power stabilizer of claim 8, wherein the power rail is configured as a component of an uninterruptible power supply (UPS), the UPS is configured to supply power to a power supply unit (PSU) of a server through the power rail, and the control circuitry is configured to smooth the power drawn by the UPS.

11. The power stabilizer of claim 8, wherein the power rail is configured as a component of a transformer substation, the transformer substation is configured to exchange power between a utility provider and a data center power distribution system through the power rail, and the control circuitry is configured to smooth the power drawn by the data center power distribution system from the utility provider.

12. The power stabilizer of claim 8, wherein the mode switch operations further include:

responsive to determining that a charge stored by the capacitor bank is outside of a predefined charge range, controllably switching the operational mode of the bi-directional converter to a charge preservation mode, wherein the bi-directional converter is configured in the charge preservation mode to control current exchanged between the capacitor bank and the power rail to drive the charge stored to be within the predefined charge range.

13. The power stabilizer of claim 8, wherein the bi-directional converter is electrically couplable to a slow power source, the slow power source including a battery or a power generator, wherein the bi-directional converter is further configured to direct current from the slow power source into the capacitor bank when operating in the first directional mode and to direct current released from the slow power source to the power rail when operating in the second directional mode.

14. The power stabilizer of claim 8, wherein the target power consumption includes a running average of the source load over the predefined time interval.

15. One or more tangible processor-readable storage media embodied with instructions for executing on one or more processors and circuits of a computing device a process of stabilizing power draw from a primary power source in a computing system, the process comprising:

determining a target power consumption based on measurements of a source load over a predefined time interval, the source load being generated by electronics supplied power by the primary power source through a power rail, the power rail electrically coupled to a capacitor bank by a bi-directional converter; and smoothing fluctuations in power drawn from the primary power source by selectively performing mode switch operations, the mode switch operations including:

controllably switching an operational mode of the bi-directional converter to a second directional mode in response to detecting that the source load exceeds the target power consumption, the bi-directional converter being configured to direct current released from the capacitor bank to the power rail when operating in the second directional mode; and controllably switching the operational mode of the bi-directional converter to a first directional mode in response to detecting that the source load has dropped below the target power consumption, the bi-directional converter being configured to direct current from the power rail into the capacitor bank when operating in the first directional mode.

16. The one or more tangible processor-readable storage media of claim 15, wherein the power rail is configured as a component of a server rack, the power rail is configured to supply power to the server rack, and the smoothing operation smooths the power drawn by the server rack from the primary power source.

17. The one or more tangible processor-readable storage media of claim 15, wherein the power rail is configured as a component of an uninterruptible power supply (UPS), the UPS is configured to supply power to a power supply unit (PSU) of a server through the power rail, and the smoothing operation smooths the power drawn by the UPS.

18. The one or more tangible processor-readable storage media of claim 15, wherein the power rail is configured as a component of a transformer substation, the transformer substation is configured to exchange power between a utility provider and a data center power distribution system through the power rail, and operation of smoothing smooths the power drawn by the data center power distribution system from the utility provider.

19. The one or more tangible processor-readable storage media of claim 15, wherein the mode switch operations further include:

responsive to determining that a charge stored by the capacitor bank is outside of a predefined charge range, controllably switching the operational mode of the bi-directional converter to a charge preservation mode in which the bi-directional converter is configured to control current exchanged between the capacitor bank and the power rail to drive the charge stored to be within the predefined charge range.

20. The one or more tangible processor-readable storage media of claim 15, wherein the target power consumption includes a running average of the source load over the predefined time interval.

\* \* \* \* \*